United States Patent
Huang et al.

(10) Patent No.: US 10,144,174 B2
(45) Date of Patent: Dec. 4, 2018

(54) THREE DIMENSIONAL PRINTING APPARATUS AND PRINTING HEAD MODULE

(71) Applicants: XYZprinting, Inc., New Taipei (TW); Kinpo Electronics, Inc., New Taipei (TW)

(72) Inventors: Chia-Hung Huang, New Taipei (TW); Yang-Teh Lee, New Taipei (TW)

(73) Assignees: XYZprinting, Inc., New Taipei (TW); Kinpo Electronics, Inc., New Taipei (TW)

( * ) Notice: Subject to any disclaimer, the term of this patent is extended or adjusted under 35 U.S.C. 154(b) by 153 days.

(21) Appl. No.: 15/180,065

(22) Filed: Jun. 12, 2016

(65) Prior Publication Data

US 2017/0291363 A1    Oct. 12, 2017

(30) Foreign Application Priority Data

Apr. 7, 2016   (CN) .......................... 2016 1 0211735

(51) Int. Cl.
*B29C 67/00*    (2017.01)
*B29C 64/118*   (2017.01)
*B29C 64/209*   (2017.01)
*B33Y 30/00*    (2015.01)

(52) U.S. Cl.
CPC .......... *B29C 64/118* (2017.08); *B29C 64/209* (2017.08); *B29C 67/0085* (2013.01); *B33Y 30/00* (2014.12)

(58) Field of Classification Search
CPC ..................................................... B33Y 30/00
See application file for complete search history.

(56) References Cited

U.S. PATENT DOCUMENTS

2015/0174824 A1*  6/2015  Gifford ............... B29C 67/0085
                                                    425/183
2016/0067920 A1   3/2016  Fontaine

FOREIGN PATENT DOCUMENTS

CN    204585844    8/2015
CN    105082543    11/2015

OTHER PUBLICATIONS

"Search Report of Europe Counterpart Application", dated Sep. 18, 2017, p. 1-p. 8.

* cited by examiner

*Primary Examiner* — Ryan M Ochylski
(74) *Attorney, Agent, or Firm* — JCIPRNET (57) ABSTRACT

A three dimensional printing apparatus and a printing head module are provided. The three dimensional printing apparatus includes a base, a printing head module and a controller. The base has a carrying surface. The printing head module includes a printing head, a fan and a nozzle guiding cover. The printing head includes a heating element, a feeding channel and a nozzle. The feeding channel connects the nozzle. The nozzle guiding cover is disposed correspondingly to the fan and extended to the nozzle. The nozzle guiding cover includes a nozzle outlet located between the nozzle and the carrying surface. The controller is coupled to the printing head module to control a hot-melt material transmitting to the nozzle, and the heating element is configured to heat the nozzle so the hot-melt material is melted and dispensed on the carrying surface to form a three dimensional object.

20 Claims, 7 Drawing Sheets

THREE DIMENSIONAL PRINTING APPARATUS AND PRINTING HEAD MODULE

CROSS-REFERENCE TO RELATED APPLICATION

This application claims the priority benefit of China patent application serial no. 201610211735.8, filed on Apr. 7, 2016. The entirety of the above-mentioned patent application is hereby incorporated by reference herein and made a part of the specification.

BACKGROUND OF THE INVENTION

Field of the Invention

The technical field relates to a three dimensional (3-D) printing apparatus and a printing head module, and relates particularly to a three dimensional printing apparatus and a printing head module with a heat dissipating module.

Description of Related Art

Along with advances in computer-aided manufacturing (CAM), the manufacturing industry has developed the technology of three-dimensional (3-D) printing, thereby rapidly fabricating products from an original design concept. In fact, the 3-D printing technology is a general term referring to a series of rapid prototyping (RP) techniques, and the basic principle is laminate manufacture, wherein a rapid prototyping machine is used to form cross-sectional shapes of a workpiece in the X-Y plane through scanning, shift intermittently at a layer thickness in the Z coordinates, and ultimately form 3-D objects. The 3-D printing technology is applicable regardless of the geometric shapes and the RP technology produces excellent outputs in particular for complex parts, which saves efforts and processing time significantly. The 3-D printing technology is capable of presenting an object of a digital three dimensional model designed by means of computer-aided design (CAD) software in the least time for the user to touch and actually feel the geometry of the model, or even to test the assemblability of the parts and possible functions.

The printing head module of the current 3-D printing apparatus is mainly comprised of a feeding tube, a heating device and a nozzle. Most of raw materials used are hot-melt forming materials. These forming materials are solid at room temperature. The solid forming material is transmitted to the nozzle through the feeding tube, hot-melted by the heating device and extruded from the nozzle, so as to form a 3-D object layer by layer.

The current feeding tube is a hollow tubular structure and made by metal materials. A side of the feeding tube near the heating device may hot-melt the faulting material early because of heat conduction. Therefore, the forming material may adhere to the inner wall of the feeding tube. Once the 3-D printing apparatus is shutdown and the heating device is cooled down, the forming material adhering to the inner wall would become hardening and clog the feeding tube. As a result, not only the performance and efficiency of printing procedure performed by the printing head module of the 3-D printing apparatus is reduced, the additional cost of maintaining and cleaning the printing head module is also increased.

SUMMARY OF THE INVENTION

The present application provides a three dimensional printing apparatus and a printing head module which may perform heat dissipation to feeding channel and hot-melt material extruded from nozzle simultaneously.

The present application provides a three-dimensional printing apparatus including a base, a printing head module and a controller. The base has a carrying surface. The printing head module is disposed above the base and includes a printing head, a fan and a nozzle guiding cover. The printing head includes a heating element, a feeding channel and a nozzle. The feeding channel connects the nozzle. The heating element is configured to heat the nozzle. The fan is disposed correspondingly to the feeding channel. The nozzle guiding cover is disposed correspondingly to the fan and extended to the nozzle. The nozzle guiding cover includes a nozzle outlet located between the nozzle and the carrying surface. The controller is electrically coupled to the printing head and the fan to control a hot-melt material transmitting to the nozzle, and the heating element is configured to heat the nozzle so the hot-melt material is melted and dispensed on the carrying surface to form a 3-D object. The controller also controls the fan to guide airflow from a plurality of heat dissipation fins to a nozzle outlet of the nozzle guiding cover.

The present application provides a printing head module configured to be disposed above a base of a three dimensional printing apparatus, to print a three dimensional object. The printing head module includes a printing head, a fan and a nozzle guiding cover. The printing head includes a heating element, a feeding channel and a nozzle. The feeding channel connects the nozzle. The heating element is configured to heat the nozzle. The fan is disposed correspondingly to the feeding channel. The nozzle guiding cover is disposed correspondingly to the fan and extended to the nozzle. The nozzle guiding cover includes a nozzle outlet located between the nozzle and the carrying surface.

Based on the above, in the three dimensional printing apparatus of the present application, the nozzle guiding cover is disposed correspondingly to the fan and extended to the nozzle of the printing head, and the nozzle outlet of the nozzle guiding cover is located between the nozzle and the carrying surface of the base so as to cool down the hot-melt material extruded on the carrying surface from the nozzle. By this arrangement, the three dimensional printing apparatus and the printing head module in the present application may simultaneously perform heat dissipation to both the feeding channel and the hot-melt material extruded on the carrying surface from the nozzle by using one single fan only. On one hand, the problem that the hot-melt material melts in the feeding channel early and clogs the feeding channel caused by the overheated feeding channel may be avoided. On the other hand, the cooling efficiency of forming the three dimensional object on the base may be improved.

To make the above features and advantages of the present invention more comprehensible, several embodiments accompanied with drawings are described in detail as follows.

DESCRIPTION OF THE EMBODIMENTS

It is to be understood that both the foregoing and other detailed descriptions, features and advantages are intended to be described more comprehensively by providing an embodiment accompanied with figures hereinafter. In the following embodiments, wordings used to indicate directions, such as "up," "down," "front," "back," "left," and "right", merely refer to directions in the accompanying drawings. Therefore, the directional wording is used to illustrate rather than limit the invention. It should be pointed out first that the same or similar reference numerals or labels represent the same or similar components in the following embodiments.

Figure 1:
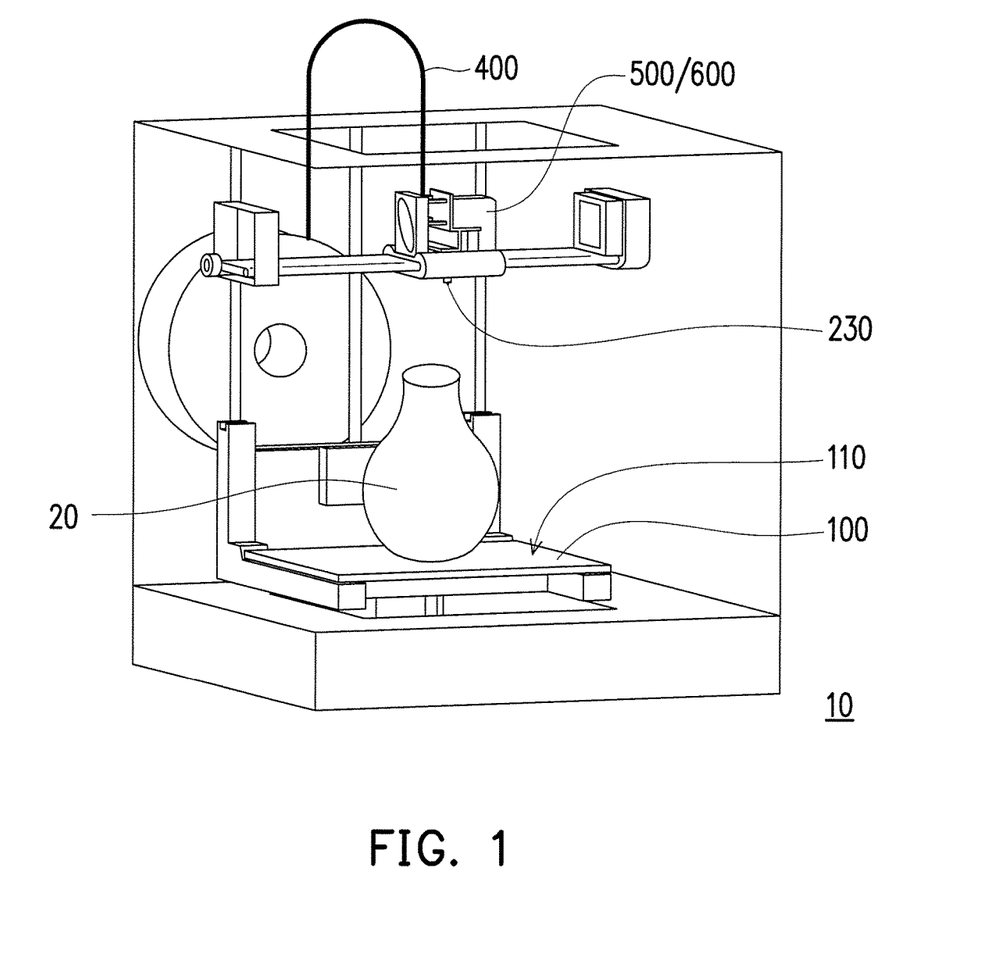
FIG. 1 is a schematic diagram of a three dimensional printing apparatus according to an embodiment of the present invention.
Figure 2:
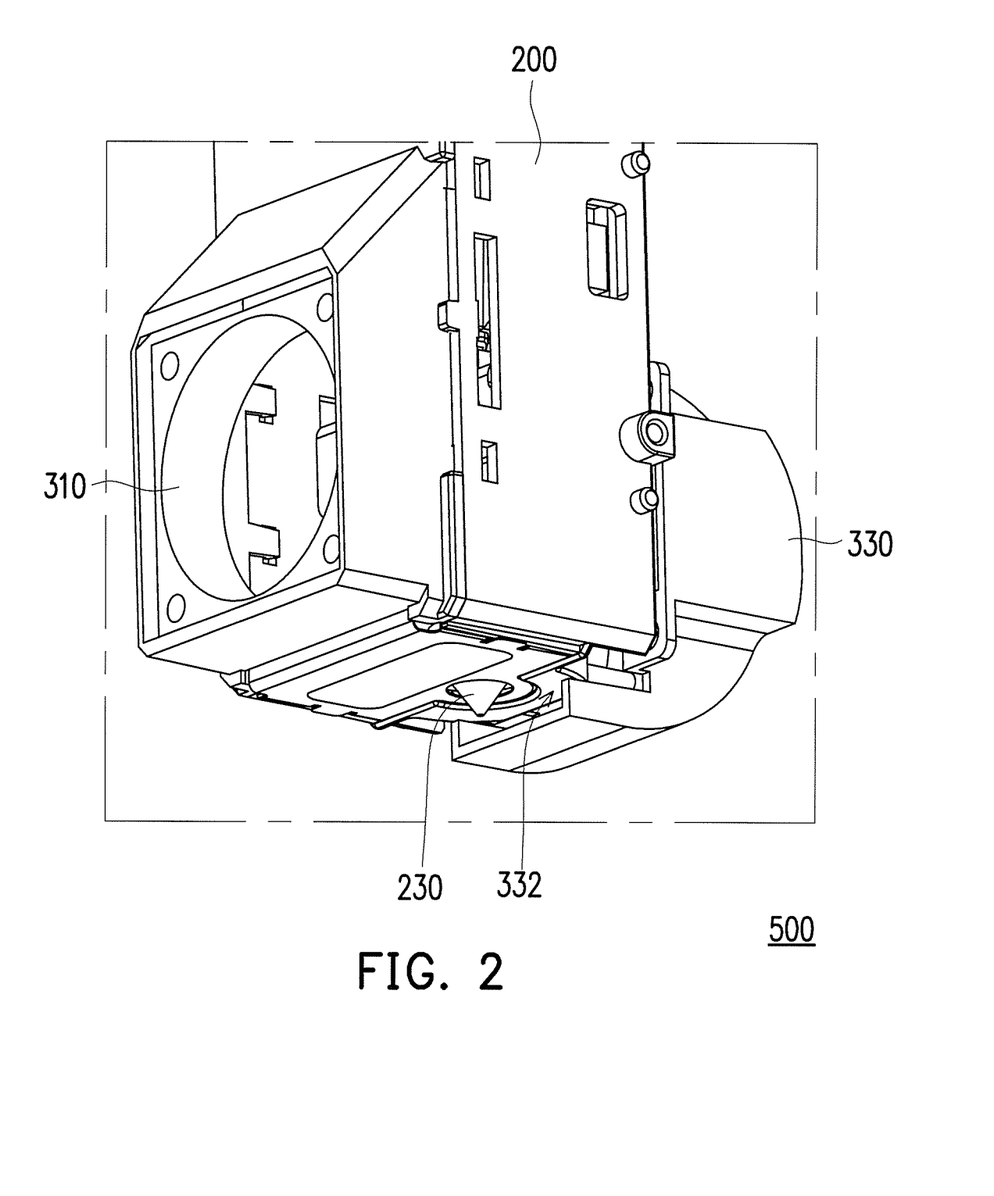
FIG. 2 is a schematic diagram of a printing head module according to an embodiment of the present invention.

FIG. 1 is a schematic diagram of a three dimensional printing apparatus according to an embodiment of the present invention. FIG. 2 is a schematic diagram of a printing head module according to an embodiment of the present invention. Referring to FIG. 1 and FIG. 2, in the present embodiment, the three dimensional printing apparatus 10 is configured to print a three dimensional object 20 according to a digital three dimensional model. The three dimensional printing apparatus 10 includes a base 100, a printing head module 500 and a controller 600. The printing head module 500 is movably disposed above the base 100. In the present embodiment, the three dimensional printing apparatus 10 further includes a processor, the processor is configured to read the digital three dimensional model and control the printing head module 500 moving relative to the base 100, wherein the digital three dimensional model may be a digital three dimensional image file built by a computer host via a computer-aided design (CAD) or an animation modeling software using.

As mentioned above, the base 100 has a carrying surface 110 configured to carry hot-melt material 400 extruded from the printing head module 500. The printing head module 500 is disposed above the base 100. In detail, in the present embodiment, the three dimensional printing apparatus 10 further includes a hot-melt material 400 connecting to the printing head module 500 as shown in FIG. 1. The hot-melt material 400 is configured to enter a nozzle 230 through the feeding channel of the printing head module 500 so as to be heated and melted, and then extruded from the nozzle 230 to be dispensed on a carrying surface 110 of the base 100 layer by layer. Accordingly, the hot-melt material 400 extruded on the carrying surface 110 is piled up to form the three dimensional object 20. Specifically, the hot-melt material 400 is composed of material with hot-melt characteristics applicable to production methods such as fused filament fabrication (FFF) or melted and extrusion modeling etc.

Figure 3:
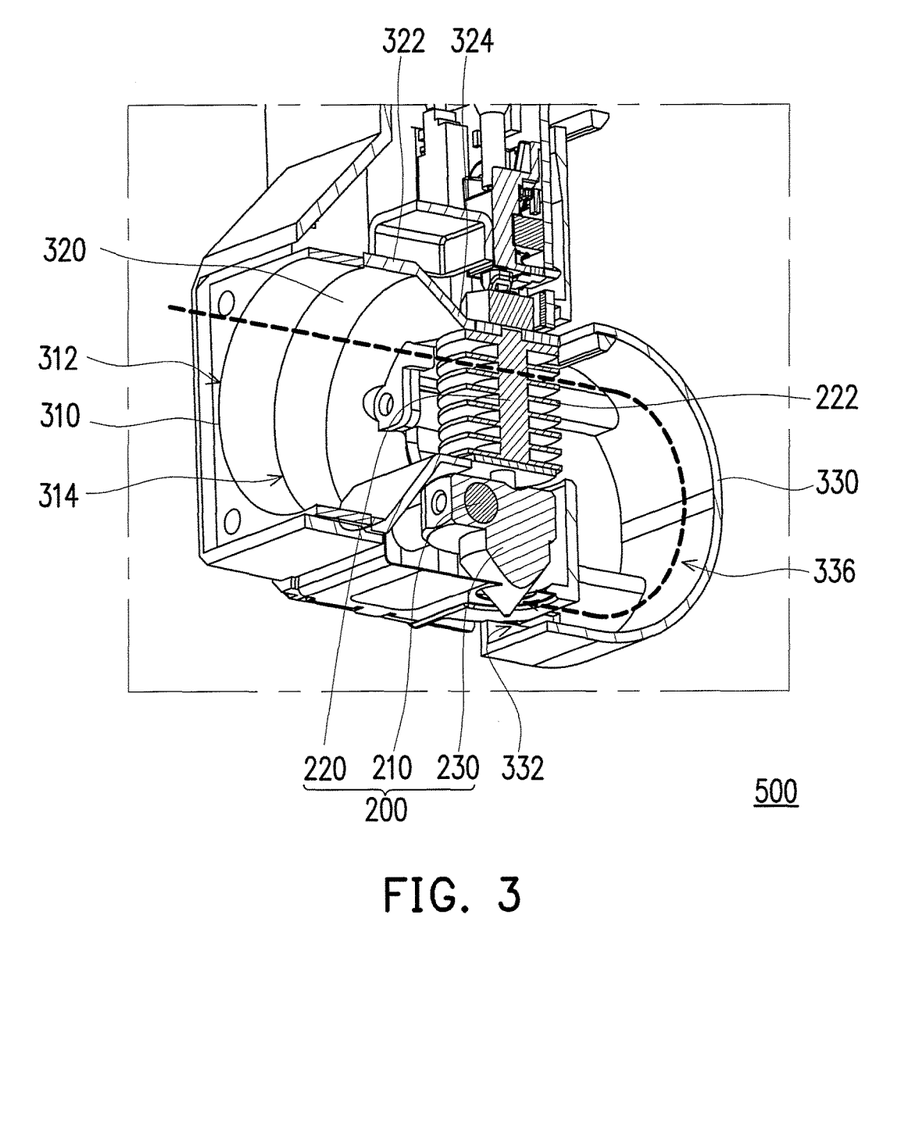
FIG. 3 is a schematic cross-sectional view illustrating the printing head module of FIG. 2.

FIG. 3 is a schematic cross-sectional view illustrating the printing head module of FIG. 2. Referring to FIG. 2 and FIG. 3. In detail, the printing head module 500 includes a printing head 200, a fan 310 and a nozzle guiding cover 330. In which the printing head 200 includes a heating element 210, a feeding channel 220 and a nozzle 230. The feeding channel 220 connects the nozzle 230. As an example, the heating element 210 may be disposed on the nozzle 230 so as to heat the nozzle 230. Accordingly, the hot-melt material 400 may enter the nozzle 230 through the feeding channel 220 by transmission of, for example, a feeding roller, to be heated and melted. After that, the melted hot-melt material 400 is extruded from the nozzle 230 and printed on the carrying surface 110 of the base 100 layer by layer. The controller 600 is electrically coupled to the printing head module 500, to control the hot-melt material 400 transmitting from the feeding channel 220 to the nozzle 230. The heating element 210 is configured to heat the nozzle 230 so the hot-melt material 400 may be melted and extruded, and dispensed on the carrying surface 110 of the base 100 to print the three dimensional object 20.

As mentioned above, the fan 310 is disposed correspondingly to the feeding channel 220 and including an air-inlet side 312 and an air-outlet side 314. In the present embodiment, the printing head module 500 further includes a feeding guiding cover 320, wherein the feeding guiding cover 320 connects the feeding channel 220 and locates between the fan 310 and the feeding channel 220 to help the feeding channel 220 performing heat dissipation, in avoid of the problem that the hot-melt material 400 melts in the feeding channel 220 early and clogs the feeding channel 220 due to overheated feeding channel 220. Moreover, in the present embodiment, the feeding channel 220 further includes a plurality of heat dissipation fins 222 disposed on an outer surface of the feeding channel 220, to further help the feeding channel 220 performing heat dissipation. The nozzle guiding cover 330 is disposed correspondingly to the fan 310 and extended to the nozzle 230. The nozzle guiding cover 330 includes a nozzle outlet 332 located between the nozzle 230 and the carrying surface 110 of the base 100. Furthermore, the nozzle outlet 332 may be disposed at a location above the carrying surface 110 and corresponding to the three dimensional object 20, so as to indirectly cool down the hot-melt material 400 dispensed on the carrying surface 110 from the nozzle 230. Therefore, the three dimensional object 20 may be cooled and solidified gradually to keep the three dimensional object 20 from cracking due to temperature dropping abruptly. The controller 600 controls the fan 310 to provide airflow, the airflow is guided to the nozzle outlet 332 of the nozzle guiding cover 330 by the heat dissipation fins 222 of the feeding channel 220.

By this arrangement, the printing head module 500 and the three dimensional printing apparatus 10 using the same may simultaneously perform heat dissipation to the feeding channel 220 and the hot-melt material 400 extruded on the carrying surface 110 from the nozzle 230 by using one single fan 310. On one hand, the problem that the hot-melt material 400 melts in the feeding channel 220 early and clogs the feeding channel 220 due to overheated feeding channel 220 may be avoided. On the other hand, the efficiency of cooling and solidification of the three dimensional object 20 may be improved.

Furthermore, the airflow provided by the fan 310 flows through the feeding channel 220 to cool down the feeding channel 220 first. Then, the airflow with higher temperature after flowing through the feeding channel 220 flows into the nozzle guiding cover 330 in order to be cooled down in the nozzle guiding cover 330. At last, the slightly cooled airflow flows out of the nozzle outlet 332 to cool down the hot-melt material 400 extruded from the nozzle 230. In other words, the airflow provided at first by the fan 310 has a first temperature, and the airflow after flowing through the feeding channel 220 has a second temperature. The second temperature is higher than the first temperature. At last, the airflow flowing out of the nozzle outlet 332 has a third temperature. The third temperature is between the first temperature and the second temperature. Specifically, the first temperature is between 20° C. to 30° C., the second temperature is about 100° C., and the third temperature is about 50° C. Accordingly, the printing head module 500 of the present embodiment directly perform is heat dissipation to the feeding channel 220 by use of airflow with lower temperature, and cools down the hot-melt material 400 extruded from the nozzle 230 by use of airflow with higher temperature, so as to keep the formed three dimensional object 20 from cracking due to temperature dropping abruptly. Therefore, the present embodiment can effectively improve the yield rate of three dimensional printing.

In detail, the feeding guiding cover 320 includes a feeding inlet 322 and a feeding outlet 324 as shown in FIG. 3, wherein the feeding inlet 322 connects the air-outlet side 314 of the fan 310 and the feeding outlet 324 connects the feeding channel 222. Thus, the fan 310 draws the airflow from the air-inlet side 312 and exhausts the airflow from the air-outlet side 314. The airflow then flows from the feeding inlet 322 to the feeding outlet 324 by a guidance of the feeding guiding cover 320, so as to perform heat dissipation to the feeding channel 222 connected to the feeding outlet 324.

In the present embodiment, the feeding guiding cover 330 connects the feeding channel 220. To be more specific, the nozzle guiding cover 330 and the feeding guiding cover 320 are disposed on two opposite sides of the feeding channel 220 respectively. The nozzle guiding cover 330 includes a nozzle inlet 334 and a guiding chamber 336. The nozzle inlet 334 connects the feeding channel 220, and the guiding chamber 336 connects between the nozzle inlet 334 and the nozzle outlet 332. By this arrangement, the airflow may flow into the nozzle guiding cover 330 through the nozzle inlet 334 after preforming heat dissipation to the feeding channel 220, and be guided to the nozzle outlet 332 through the guiding chamber 336, so as to cool down the hot-melt material 400 extruded from the nozzle 230. Briefly, the flow path of the airflow may be illustrated as the dashed arrow depicted in FIG. 3, the airflow is drew by the fan 310 and flows into the feeding channel 220 by a guidance of the feeding guiding cover 320, to perform heat dissipation to the feeding channel 220. Then, the airflow flows out of the nozzle outlet 332 located between the nozzle 230 and the carrying surface 110 of the base 100 by a guidance of the nozzle guiding cover 330 to cool down the hot-melt material 400 extruded from the nozzle 230.

Figure 4:
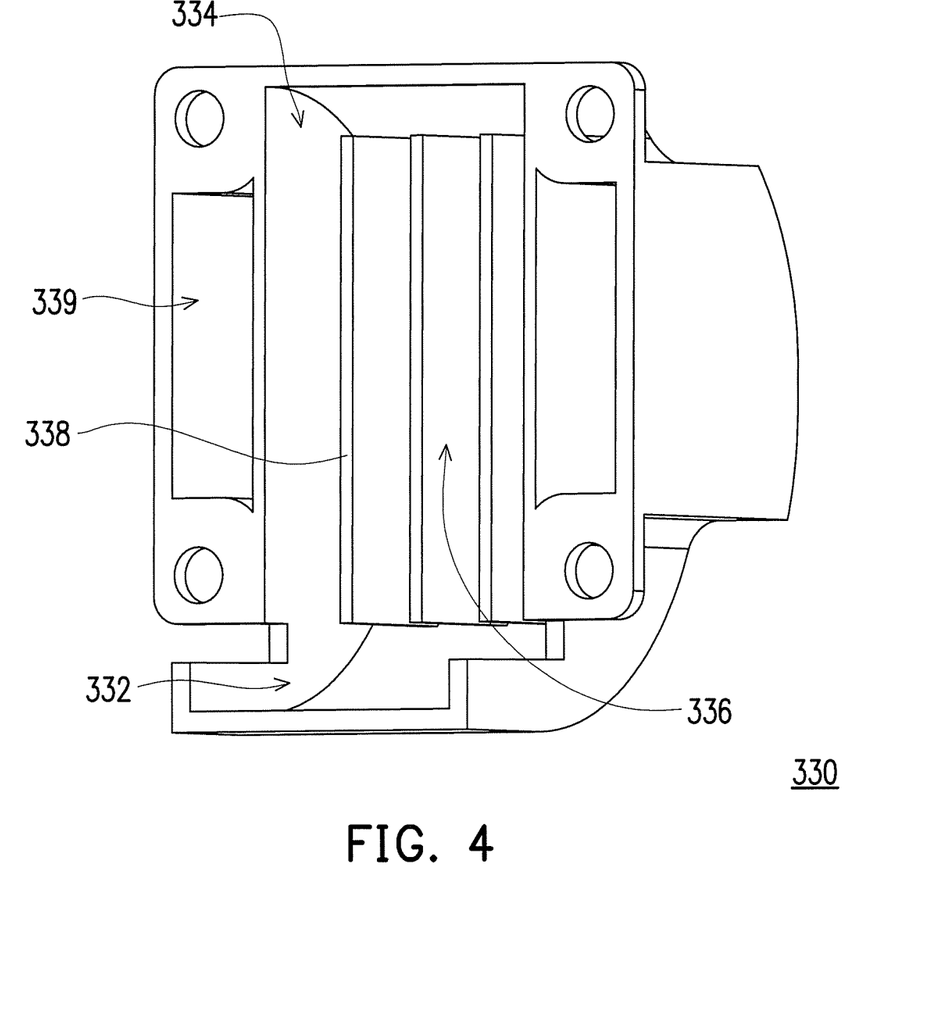
FIG. 4 and FIG. 5 are schematic diagrams of a nozzle guiding cover from different perspectives according to an embodiment of the present invention.
Figure 5:
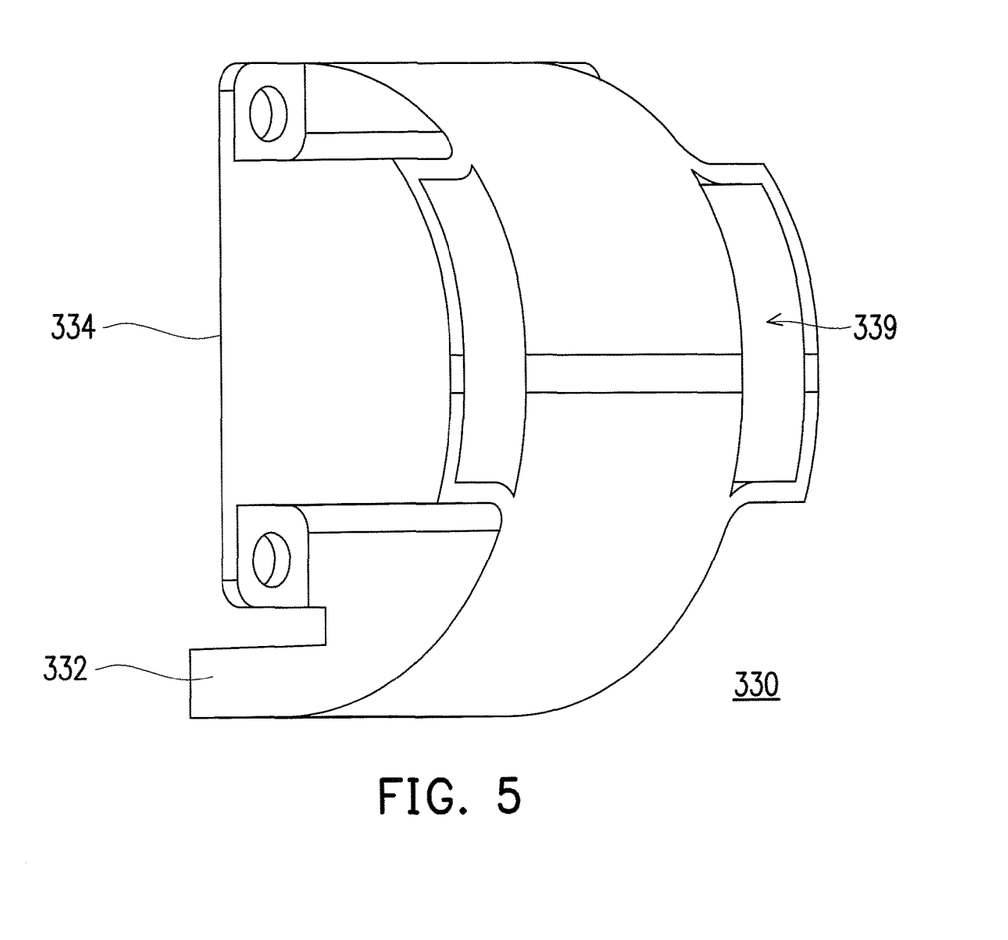

FIG. 4 and FIG. 5 are schematic diagrams of a nozzle guiding cover from different perspectives according to an embodiment of the present invention. Referring to FIGS. 3 to 5. The airflow flows into the nozzle guiding cover 330 after performing heat dissipation to the feeding channel 220, so the airflow flows into the nozzle guiding cover 330 with higher temperature. Therefore, in the present embodiment, the nozzle guiding cover 330 may further include a plurality of guiding fins 338 as shown in FIG. 4, and the guiding fins may be disposed in the guiding chamber 336, so as to increase contact area between the airflow and the nozzle guiding cover 330 to improve the efficiency of heat exchange, and further cool down the airflow flowing through the feeding channel 220.

In addition, a cross-sectional area of the nozzle inlet 334 is substantially larger than a cross-sectional area of the nozzle outlet 332, thus the airflow may gather in the guiding chamber 336, so that the airflow may not be exhausted from the nozzle outlet 332 smoothly. Accordingly, in the present embodiment, the nozzle guiding cover 330 further includes a plurality of guiding holes 339, which may be disposed on the guiding chamber 336 so that a part of the airflow may be exhausted from the guiding holes 339, so as to reduce the pressure in the guiding chamber 336 is and the rest part of the airflow may be exhausted from the nozzle outlet 332 smoothly.

Figure 6:
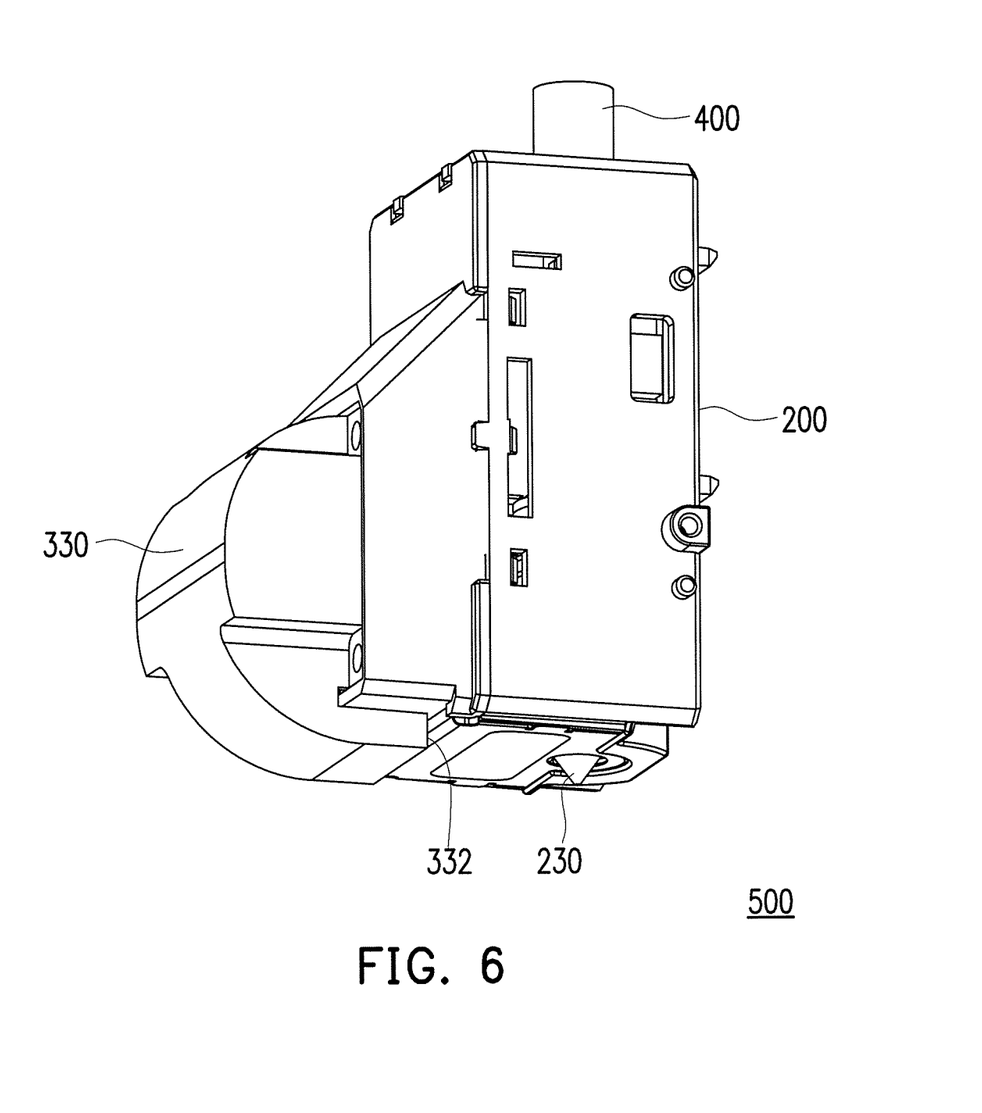
FIG. 6 is a schematic diagram of a printing head module according to another embodiment of the present invention.
Figure 7:
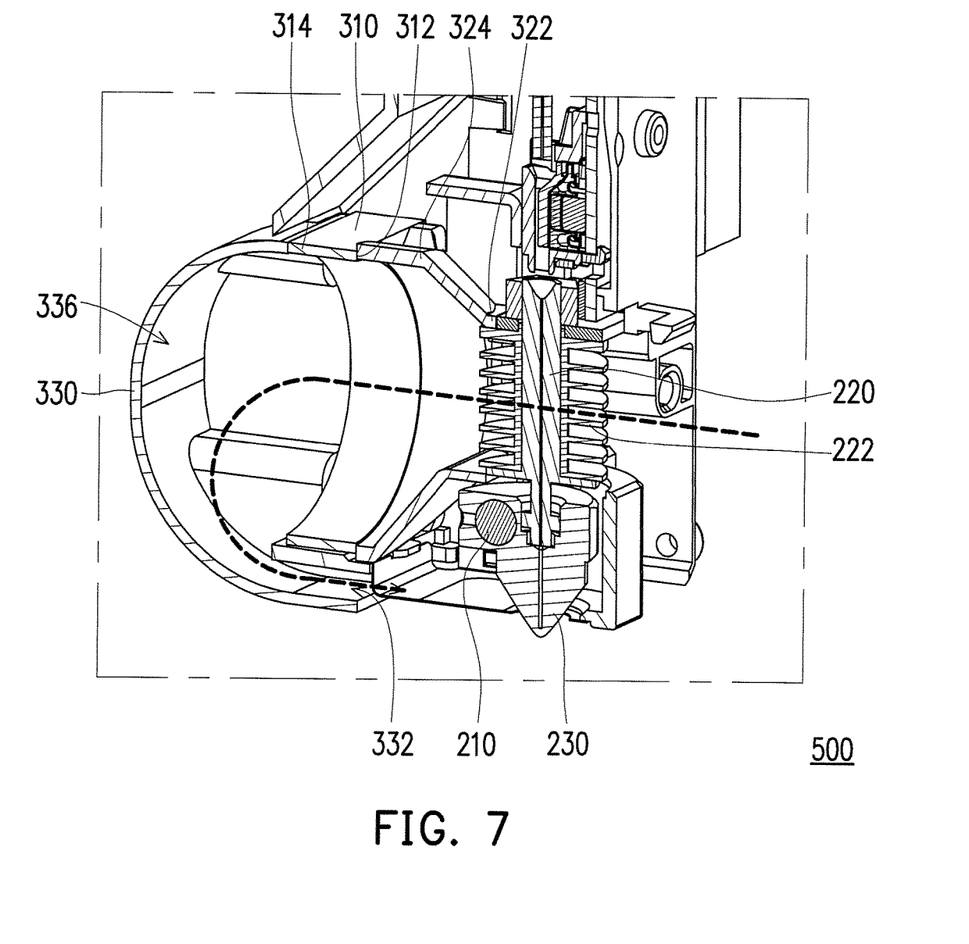
FIG. 7 is a schematic cross-sectional view illustrating the printing head module of FIG. 6.

FIG. 6 is a schematic diagram of a printing head module according to another embodiment of the present invention. FIG. 7 is a schematic cross-sectional view illustrating the printing head module of FIG. 6. It should be noted that the printing head module 500 of the present embodiment is similar to the printing head module 500 of FIG. 2 and FIG. 3. Therefore, the reference numerals and a part of contents in the previous embodiment are used in the present embodiments, in which identical reference numerals indicate identical or similar components, and repeated description of the same technical contents is omitted. For a detailed description of the omitted parts, reference can be found in the previous embodiment, and no repeated description is contained in the present embodiments. Referring to FIG. 6 and FIG. 7, the following description is directed against to the differences between the printing head module 500 of the present embodiment and the printing head module 500 of FIG. 2 and FIG. 3.

In the present embodiment, the feeding guiding cover 320 includes a feeding inlet 322 and a feeding outlet 324, wherein the feeding inlet 322 connects the feeding channel 220 and the feeding outlet 324 connects to the air-inlet side 312 of the fan 310. In other words, in the embodiment of FIG. 2, the air-outlet side 314 of the fan 310 faces the feeding channel 220 so that the airflow drew into the fan 310 is blew to the feeding channel 220 through the feeding guiding cover 320. In the present embodiment, the air-inlet side 312 of the fan 310 faces the feeding channel 220, so as to make the airflow flowing through the feeding channel 220 directly, and being drew into the air-inlet side 312 of the fan 310 through the feeding guiding cover 320.

As mentioned above, the feeding outlet 324 connects the air-inlet side 312 of the fan 310 and the nozzle guiding cover 330 connects the air-outlet side 314 of the fan 310. That is, the fan 310 connects between the feeding guiding cover 320 and the nozzle guiding cover 330. Thus, the airflow flows through the feeding channel 220 first and then be drew to the air-inlet side 312 of the fan 310 through the feeding guiding cover 320. After that, the airflow is blew into the nozzle guiding cover 330 from the air-outlet side 314 of the fan 310. In detail, the nozzle guiding cover 330 includes a nozzle inlet 334 and a guiding chamber 336, wherein the guiding chamber 336 connects between the nozzle inlet 334 and the nozzle outlet 332 and the nozzle guiding cover 330 is connected to the air-outlet side 314 of the fan 310 with the nozzle inlet 334.

By this arrangement, the airflow may further flow into the nozzle guiding cover 330 through the nozzle inlet 334 after performing heat dissipation to the feeding channel 220. Then the airflow may be guided to the nozzle outlet 332 through the guiding chamber 336 to cool down the hot-melt material 400 extruded from the nozzle 230. Briefly, the flow path of the airflow can be illustrated as the dashed arrow depicted in FIG. 7; by drawing the air with the fan 310, the airflow flows through the feeding channel 220 to perform heat dissipation to the feeding channel 220. The airflow is then drew into the fan 310 through the feeding guiding cover 320, and blew out from the fan 310 to flow into the nozzle guiding cover 330, such that the airflow exhausts from the nozzle outlet 332 located between the nozzle 332 and the carrying surface 110 of the base 100 by a guidance of the nozzle guiding cover 330, in order to cool down the hot-melt material 400 extruded from the nozzle 230.

In addition, the nozzle guiding cover 330 may also include a plurality of guiding fins 338 and a plurality of guiding holes 339 in the present embodiment as shown in FIG. 4, wherein the guiding fins 338 may be disposed in the guiding chamber 336 to increase contact area between the airflow and the nozzle guiding cover 330 and improve the efficiency of heat exchange, so as to cool down the airflow flowing through the feeding channel 220. In addition, a cross-sectional area of the nozzle inlet 334 is substantially larger than a cross-sectional area of the nozzle outlet 332, so the guiding holes 339 are disposed on the guiding chamber 336 to make a part of airflow discharging from the guiding holes 339. Therefore, the pressure in the guiding chamber 336 may be reduced and the airflow may be exhausted from the nozzle outlet 332 smoothly.

In summary, in the printing head module and the three dimensional printing apparatus using the same of the invention, the feeding guiding cover is connected to the feeding channel and located between the fan and the feeding channel, so as to help guiding the airflow to the feeding channel to perform heat dissipation. Moreover, the nozzle guiding cover is disposed correspondingly to the fan and extended to the nozzle of the printing head module, and the nozzle outlet of the nozzle guiding cover is located between the nozzle and the carrying surface of the base, so as to cool down the hot-melt material extruded on the carrying surface from the nozzle. By this arrangement, the printing head module and the three dimensional printing apparatus using the same of the invention may simultaneously perform heat dissipation to the feeding channel and the hot-melt material extruded on the carrying surface from the nozzle by using one single fan only. On one hand, the problem that the hot-melt material melts in the feeding channel early and clogs the feeding channel due to overheated feeding channel may be avoided. On the other hand, the efficiency of cooling and solidification of the three dimensional object may be improved. Accordingly, the production cost of the printing head module and the three dimensional printing apparatus using the same can be reduced. Furthermore, the quality and efficiency of three-dimensional printing can also be improved.

Although the invention has been described with reference to the above embodiments, it will be apparent to one of ordinary skill in the art that modifications to the described embodiments may be made without departing from the spirit of the invention. Accordingly, the scope of the invention will be defined by the attached claims and not by the above detailed descriptions.

What is claimed is:

1. A three dimensional printing apparatus configured to print a three dimensional object, comprising:
   a base having a carrying surface;
   a printing head module disposed above the base, comprising:
   a printing head comprising a heating element, a feeding channel and a nozzle, wherein the feeding channel comprises a plurality of heat dissipation fins disposed on an outer surface of the feeding channel, the feeding channel connects the nozzle, and the heating element is configured to heat the nozzle;
   a fan comprising an air-inlet side and an air-outlet side opposite to the air-inlet side, wherein the air-inlet side facing the feeding channel; and
   a nozzle guiding cover disposed on an air-outlet side of the fan and extended to the nozzle, wherein the nozzle guiding cover comprises a nozzle outlet, the nozzle outlet is located between the nozzle and the carrying surface; and
   a controller electrically coupled to the printing head module to control a hot-melt material transmitting from the feeding channel to the nozzle, wherein the heating element is configured to heat the nozzle so the hot-melt material is hot-melted and extruded, and the hot-melt material is dispensed on the carrying surface to form the three dimensional object, the controller controls the fan to provide an airflow, and the airflow is guided from the heat dissipation fins to the nozzle outlet of the nozzle guiding cover, and the airflow flows through the feeding channel, the fan and the nozzle guiding cover along a direction perpendicular to an axial direction of the feeding channel.

2. The three dimensional printing apparatus as claimed in claim 1, wherein the printing head module further comprises:
   a feeding guiding cover disposed on the feeding channel, and located between the fan and the feeding channel.

3. The three dimensional printing apparatus as claimed in claim 2, wherein the feeding guiding cover comprises a feeding inlet and a feeding outlet, the feeding inlet is disposed on the feeding channel, and the feeding outlet is disposed on an air-inlet side of the fan.

4. The three dimensional printing apparatus as claimed in claim 2, wherein the feeding guiding cover and the nozzle guiding cover are disposed at two opposite sides of the fan.

5. The three dimensional printing apparatus as claimed in claim 1, wherein the nozzle guiding cover comprises a nozzle inlet and a guiding chamber, the guiding chamber is connected between the nozzle inlet and the nozzle outlet.

6. The three dimensional printing apparatus as claimed in claim 5, wherein the nozzle inlet is disposed on an air-outlet side of the fan.

7. The three dimensional printing apparatus as claimed in claim 6, wherein the nozzle inlet is connected to the feeding channel.

8. The three dimensional printing apparatus as claimed in claim 1, wherein the nozzle guiding cover comprises a plurality of guiding fins disposed in the guiding chamber.

9. The three dimensional printing apparatus as claimed in claim 1, wherein the nozzle guiding cover comprises a plurality of guiding holes disposed on the guiding chamber.

10. The three dimensional printing apparatus as claimed in claim 1, wherein a cross-sectional area of the nozzle inlet is substantially larger than a cross-sectional area of the nozzle outlet.

11. The three dimensional printing apparatus as claimed in claim 1, wherein the nozzle outlet is disposed above the three dimensional object to cool down the hot-melt material extruded from the nozzle.

12. A three dimensional printing apparatus configured to print a three dimensional object, comprising:
   a base having a carrying surface;
   a printing head module disposed above the base, comprising:
   a printing head comprising a heating element, a feeding channel and a nozzle, wherein the feeding channel comprises a plurality of heat dissipation fins disposed on an outer surface of the feeding channel, the feeding channel connects the nozzle, and the heating element is configured to heat the nozzle;
   a fan comprising an air-outlet side facing the feeding channel; and a nozzle guiding cover disposed on the feeding channel and extended to the nozzle, wherein the nozzle guiding cover comprises a nozzle outlet, the nozzle outlet is located between the nozzle and the carrying surface, and the nozzle guiding cover and the fan are disposed on two opposite sides of the feeding channel respectively; and a controller electrically coupled to the printing head module to control a hot-melt material transmitting from the feeding channel to the nozzle, wherein the heating element is configured to heat the nozzle so the hot-melt material is hot-melted and extruded, and the hot-melt material is dispensed on the carrying surface to form the three dimensional object, the controller controls the fan to provide an airflow, and the airflow is guided from the heat dissipation fins to the nozzle outlet of the nozzle guiding cover, and the airflow flows through the feeding channel, the fan and the nozzle guiding cover along a direction perpendicular to an axial direction of the feeding channel.

13. The three dimensional printing apparatus as claimed in claim 12, wherein the printing head module further comprises:

a feeding guiding cover disposed on the feeding channel and located between the fan and the feeding channel, wherein the feeding guiding cover comprises a feeding inlet and a feeding outlet, the feeding outlet is disposed on the feeding channel, and the feeding inlet is disposed on an air-outlet side of the fan.

14. The three dimensional printing apparatus as claimed in claim 12, wherein the nozzle guiding cover is directly disposed on the feeding channel.

15. The three dimensional printing apparatus as claimed in claim 12, wherein the nozzle guiding cover comprises a nozzle inlet and a guiding chamber, the guiding chamber is connected between the nozzle inlet and the nozzle outlet.

16. The three dimensional printing apparatus as claimed in claim 12, wherein the nozzle inlet is disposed on the feeding channel.

17. The three dimensional printing apparatus as claimed in claim 12, wherein the nozzle guiding cover comprises a plurality of guiding fins disposed in the guiding chamber.

18. The three dimensional printing apparatus as claimed in claim 12, wherein the nozzle guiding cover comprises a plurality of guiding holes disposed on the guiding chamber.

19. The three dimensional printing apparatus as claimed in claim 12, wherein a cross-sectional area of the nozzle inlet is substantially larger than a cross-sectional area of the nozzle outlet.

20. The three dimensional printing apparatus as claimed in claim 12, wherein the nozzle outlet is located above the three dimensional object to cool down the hot-melt material extruded from the nozzle.

* * * * *